3,008,387
POLYESTER PAVING PROCESS

Clifford V. Wittenwyler, Union, and Ralph E. Brown, Murray Hill, N.J., assignors to Shell Oil Company, a corporation of Delaware
No Drawing. Filed June 16, 1958, Ser. No. 742,065
9 Claims. (Cl. 94—22)

This invention relates to new surfacing compositions. More particularly, the invention relates to new surfacing compositions containing organic resinous polyesters which are particularly useful as non-skid pavings for concrete and to a process for employing such compositions.

Modern concrete floor and highway surfaces, while durable, shock- and weather-resistant and repairable, suffer to some extent from their tendency to be slippery when wet. As a consequence, considerable attention has been paid to the development of surfacing materials which would provide an adherent long-lasting inexpensive skidproof surface to concrete. The compositions should, in general, be based on a flexible binder which would securely bond the abrasive constituent to the concrete surface for long periods, despite the ravages of sunshine, rain, extremes of heat and cold, and the mechanical stresses and shocks to which contemporary traffic arteries and storage areas are subjected. Various types of substances have been proposed for such a use, but they have generally real limitations. In many cases, the coatings have failed to have sufficient adhesion to the grit and the concrete surface. In other cases, the coatings did not endure under exposure to all varieties of weather, from hot to freezing. In still other cases, the coatings lacked flexibility and resistance to mechanical stresses. Many of the coatings proposed have been expensive or difficult to apply.

In general, a thermosetting resin is required for concrete coating applications to provide the strength necessary to resist shoving on hot days or when heat is generated by friction from skidding. Moreover, such a resin would resist attack from oil, gasoline, or other chemical or solvents which are occasionally spilled upon it in the normal course of its use. Because of their low cost and plentiful supply, polyester resins appeared attractive for inclusion in concrete surfacing compositions wherein a combination of economy and good chemical and physical properties were sought. It was soon found, however, that although the polyester resins displayed desirable cost and physical features, a serious drawback to their use was the relative weakness of the polyester-concrete bond, particularly under conditions of alternate freezing and thawing.

It is an object of this invention, therefore, to provide a new non-skid formulation for concrete paving compositions. It is a further object to provide new flexible non-skid paving compositions which have excellent adhesion to concrete, wood and metal surfaces. It is a further object to provide new surfacing compositions which form flexible coatings having excellent skid-resistance and are resistant to wear, rain and hot and cold weather. A still further object is the provision of a surfacing composition that will cure quickly and in contact with air to yield a paving having good resistance to solvents and other chemical agents. A further object of the invention is the provision of new surface coatings which are relatively inexpensive and can easily be applied to roads, bridges, sidewalks, and other concrete, metal or wood surfaces. Other objects and advantages of the invention will be apparent from the following detailed description thereof.

It has now been discovered, unexpectedly, that these and other objects may be accomplished by the surfacing compositions of our invention, which comprise a reactive monomeric solvent containing a mixture of polyester resins, of which from 70–90% is a rigid-type polyester resin prepared by the reaction of an acidic organic substance selected from polycarboxylic acids and anhydrides thereof, with an organic polyol, at least 90% of said components being either unsaturated or aromatic, the remainder of the polyester resin being a flexible polyester resin prepared by the reaction of organic acidic components selected from polycarboxylic acids and anhydrides thereof, at least 10% of which are saturated and linear, with an organic polyol; an organic peroxide; an air-impermeable organic substance; an accelerator; and at least 25% by weight of finely divided inert abrasive particles.

We have discovered that not only are these compositions inexpensive and easy to use, but they also display excellent adhesion to all types of surfaces, and particularly to concrete, wood and metal. The compositions are easily applied and cured to hard but flexible and tough coatings which stand up well after long periods of mechanical wear and exposure. The coatings also show excellent stability under hot and cold weather conditions and display superior resistance to solvent, deicing salts, acids and other chemicals. A particularly attractive feature of the coatings is that they may be applied to new or used surfaces and set up quickly and easily without resort to special curing conditions. As will be demonstrated hereinafter, the compositions of this invention have been found to be useful not only for the treating of highways and roads but also for dock areas, warehouse floors, sidewalks, ship decks and the like, where non-skid weather-resistant surfaces are required.

The larger part of the polyester resins employed in the paving composition of our invention is that type of resin which, because of the rigid nature of their polymers, are known as rigid, and which comprises unsaturated or polymerizable, as well as aromatic polyester resins. These resins are prepared from the reaction between a polybasic acid or anhydride, and a polyhydric alcohol, 90% of either or both of which reactants is either unsaturated, that is, contains at least one olefinic bond, or is aromatic. In general, the olefinic or aromatic component is the acidic one, and such unsaturated acidic materials may be either aliphatic or aromatic. For example, maleic and fumaric acids, itaconic acid, the halofumaric acids, mesaconic acid, citraconic acid, pyrotartaric acid, as well as phthalic, terephthalic and isophthalic acids and maleic and phthalic anhydrides are included as acidic materials, as are such polycarboxylic acids and anhydrides as prehnitic, mellophanic, trimellitic and pyromellitic acids and pyromellitic anhydride. Citric, tartaric, diphenic, tricarballylic and homophthalic acids may also be employed.

The rigid polyesters are prepared from these olefinic acidic compounds by condensing them with polyhydric alcohols in manners which are well known to those skilled in the art and which form no part of this invention. Examples of such polyhydric alcohols are glycerol, ethylene glycol and higher homologs thereof, such as propylene glycol; diethylene glycol and higher polyglycols; polyglycerols; triethanolamine; sorbitol; pentaerythritol; dipentaerythritol; monoalkyl and aryl ethers of glycerol, sorbitol, etc.

While the solids prepared by curing these unsaturated polyester resins are inexpensive and have good wearing properties, we have found that when they are employed without modification in road coatings, they are too rigid and brittle to absorb road shocks, and crack, chip and are otherwise unsatisfactory. We have, however, discovered that by incorporating in these unsaturated polyester paving compositions comparatively small amounts of flexible polyesters, the toughness and flexibility of the resultant material is greatly enhanced, and a paving composition having valuable properties of strength and resilience is obtained.

By flexible polyester resins, we mean those resins which include products prepared by the reaction between linear saturated polybasic acids, or their anhydrides, and polyhydric alcohols. Examples of such linear saturated acids include oxalic, malonic, succinic, glutaric, adipic, pimelic, suberic, azelaic and sebacic acids; and suitable saturated anhydrides include succinic and glutaric anhydrides.

The flexible polyesters are prepared from these linear saturated acidic compounds by condensing the latter with the unsaturated or aromatic acidic compounds and polyhydric alcohols of the type described above.

Flexible polyester resins which are most suitable for use in our invention are resins in which the molar amount of the saturated polycarboxylic acid or anhydride employed in their preparation is at least 10% of the total molar amount of the unsaturated or aromatic polycarboxylic acid used. For example, flexible polyester resins which have properties which render them desirable for use in our paving compositions are those prepared by reacting adipic acid and maleic anhydride, in molar proportions of about one to two, with equimolar amounts of such glycols as ethylene glycol, propylene glycol, or diethylene glycol. The resulting polyester resins, while containing unsaturated linkages resulting from the inclusion of the maleic anhydride component, are afforded flexibilizing characteristics by the inclusion therein of the saturated acid component. Flexible polyester resins which may be employed in our paving compositions are those in which the molar amount of saturated acid or anhydride used is from about one-tenth to one-half of the molar amount of the aromatic or unsaturated acidic compound, or from about one-tenth up to one-half of the total molar amount of acidic reactant.

Polyester compositions having suitable physical properties for paving uses are obtained when at least two-thirds of the polyester is made up of unsaturated or aromatic rigid polyester resin, and the remainder of the flexible polyester. The preferable paving formulations are those wherein the polyester resin contains from about 70% up to about 90% of the rigid polyester resin, while the most preferred composition, from the point of view of speed of cure and long wear, is that containing about 80% of the rigid polyester and about 20% of the flexible. By use of formulations containing these proportions of unsaturated or aromatic and saturated polyester, paving compositions having lasting adhesion to the underlying surface are achieved.

Inasmuch as the polyester resins described are frequently solids or viscous liquids, we have found that their use in paving applications is enhanced and facilitated by using in conjunction with them a liquid polymerizable monomeric compound which serves as a diluent or solvent for the polyester resins, and which may be readily cured to a solid while copolymerizing with the polymerizable components of the polyester. Such monomers are characterized by their possession of at least one olefinic bond, that is a $>C=C<$ linkage.

Suitable monomers comprise such well-known materials as styrene, vinyl toluene, diallyl phthalate, divinyl benzene, alpha-methyl styrene, methyl methacrylate and triallyl cyanurate. The monomer component may be conveniently employed in amounts up to about 50% by weight of the combined styrene-polyester resin composition. By virtue of the polymerization of the monomer with the unsaturated components of the polyester, a desirable rigidity and homogeneity may be added to the entire composition. This polymerization or cure is achieved under the influence of the peroxide catalyst. The curing reaction itself is exothermic and the heat thus evolved aids in speeding the cure.

The polyester, together with the polymerizable mono-
mer and the other ingredients of our paving composition, are employed in the form of liquids or sand slurries which may be readily handled and put down on surfaces, and which are cured in place to yield solid paving surfaces. As catalysts or curing agents, we have found that organic peroxides give the best results in our composition, since they are inexpensive and may be easily added to the polyester-monomer mixture to give cures at room temperatures or slightly above. Examples of such catalysts embrace cumene hydroperoxide, benzoyl peroxide, di-tert butyl peroxide, lauroyl peroxide, and the like.

Best adhesion to concrete, however, is obtained when a neutral organic peroxide is used, rather than an acidic peroxide. Whether the improved adhesion which is achieved when neutral peroxides are used in place of acidic peroxides is due to the fact that acidic peroxides yield, upon decomposition, acidic products which attack the concrete, is not known. However, we have unexpectedly found that by using neutral peroxides as curing agents for the polymerizable polyester resins, concrete adhesion bond superior in strength and durability are obtained.

By neutral organic peroxide we mean a member of the class of peroxides whose structure does not include the structure

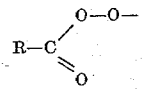

where R is a monovalent organic radical. The latter configuration has acidic properties or, through decomposition, is believed to yield acidic products.

Neutral peroxides instead are peroxides including in their structure only the configuration

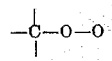

where the carbon atom is not also a carbonylic carbon atom.

A particularly preferred class of such neutral peroxides is the ketone peroxides. These peroxides are prepared by the reaction of ketones with hydrogen peroxide, and their nature and reaction, as well as those of other organic peroxides, both neutral and acidic, are set forth in Tobolsky and Mesrobian, Organic Peroxides (Interscience, 1954). The ketone peroxides have the general structure

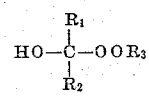

where $R_1$ and $R_2$ are the same or different monovalent organic radicals, and $R_3$ is a hydrogen atom or a monovalent organic radical. Examples of such ketone peroxides include methyl ethyl ketone peroxide, methyl phenyl ketone peroxide, diphenyl ketone peroxide, methyl vinyl ketone peroxide, mesityl oxide peroxide, and the like.

These ketone curing agents may be added to the composition in their pure form, or they may be added in solution in such inert organic solvents as the phthalate esters, including dimethyl and dioctyl phthalate. The concentration in which the ketones may be used ranges from 0.05% by weight of the unsaturated polyester resin to about 5% by weight, while the preferred range is between about 0.1% and about 1% by weight of the unsaturated polyester resin.

In addition to the neutral peroxide curing agents, we have found that driers or accelerators are important in promoting the curing of the paving compositions of the invention under the conditions of use. In general, these driers consist of metal salts of organic acids, or metallic soaps. These accelerators include the cobalt, lead manganese, calcium, zinc and iron soaps of organic acids. Preferred organic acids from which the metal soaps are prepared include naphthenic acid, octoic acid, stearic acid and lauric acid. Of these accelerators, the most preferred is cobalt naphthenate because of its improved solubility and activity. Quantities of these accelerators which are used in the paving composition of the invention will depend, of course, on the nature of the polyester, peroxide curing agent and accelerator used, but in general amounts of accelerator between about 0.1% and 10% by weight, based on the polyester, have proved useful. When such accelerators are employed, improved cures, from the standpoint of heatless curing speed and ultimate hardness of the paving composition, are obtained.

When our polyesters are cured in the presence of air, we have observed that they yield an undesirable tacky, incompletely cured surface. The incomplete cure is believed to be due to the inhibiting effect of atmospheric oxygen on the polymerization. By the addition of an inert, air-impermeable organic substance to the composition, the tackiness, whatever its cause, is eliminated. Such inert substances are preferably selected from the group of waxes comprising natural and synthetic waxes. By natural waxes are meant beeswax, China wax and other insect waxes, animal waxes such as wool wax and spermaceti, plant waxes including palm wax and such shrub waxes as candelilla, flax wex and cotton wax, etc. Also natural waxes and, because of their low cost, inertness and great availability, the preferred waxes in this invention are petroleum waxes, particularly paraffin waxes. Synthetic waxes may also be used in our invention, and these include, for example, polyethylene waxes, such polyoxyethylene glycol waxes as "Carbowax 4000," halogenated paraffin and chlorinated naphthalenes, such as the "Halowaxes," hydrogenated drying oils, and the like. Small quantities of such materials, between about 0.1 to 5% by weight of the total polyester resin, have been found to give satisfactory results.

The preceding discussion has been devoted to the composition and nature of the durable resinous binder that, in the invention, renders the non-skid surface adherent to the concrete, metal or wood surface. What gives the surface its non-skid properties, however, is the inclusion in the binder of finely divided inert abrasive particles. The particles of the paving composition must, of course, be solid and should preferably have a mesh size between 4 and 50. Preferred materials include sand, crushed rock, crushed quartz, finely divided shells, aluminum oxide, finely divided resinous particles, glass particles, and the like. Particularly preferred because of their durability and low cost are the mineral, and particularly the siliceous, materials such as sand and crushed rock. Mixtures of such particles as are noted may also be used.

The amount of the inert particles present in the paving composition should be at least 25% by weight of the total composition, and may be from about 33% to about 95% of the total mass of the paving composition.

The paving compositions of the invention may be prepared by any suitable method. The polyester resins mixed with the monomeric polymerizable organic compounds are generally fluids, and may be simply mechanically mixed together without the application of heat or the use of solvents. To the resulting mixture may be added the other ingredients, although the curing agent should not be added until the paving composition is to be cured. Thus, it is generally preferred to prepare the polyester resin-monomer-wax-accelerator compositions and curing agent compositions as two separate packages, and mix the two just before application to the surface to be treated. The curing agent may also be sprayed or otherwise added to the polyester resin and accelerator after it has been applied to the desired surface, but this procedure is less preferred. In general, the polyester resin and other ingredients are most conveniently applied to the underlying surface and the crushed quartz or other abrasive added to the resulting coating. Rollers, squeegees, brooms, and other road-coating devices may be used in methods well known to those skilled in the floor-surfacing and road-coating arts.

Preferably the surface to be so treated should be free from water, oil, grease, loose dirt and other substances that might interfere with the creation of a tenacious resin-surface bond. Thus, the surface should, for best results, be washed with dilute acid or other cleaning medium, after which all trace of the cleaning agent should be removed from the surface. Use of steel brushes, detergent solutions or other cleaning means is also helpful.

The compositions of the invention may be applied to any surface, but are particularly suitable for coating concrete, wood and steel. The concrete may be of any of the usual types that are prepared from hydraulic cements, such as Portland cement, and other types of aluminous and oxy salt-type cements. The paving compositions may be applied in very thin coatings or very thick coatings, although an extremely economical coating density is achieved by using about four or five pounds of resin per square yard.

The paving compositions of our invention may also be employed as binders for aggregate in the construction of new roadways, airfields and walkways. In such instances the polyester resin, polymerizable monomer, air-impermeable organic material and other ingredients may be mixed with the aggregate in a cement or other type of mixer and then applied to the prepared roadway bed and cured in place. The amount of the binding composition required will depend, of course, on the nature and particle sizes of the aggregate employed, but it must be sufficient to produce a stable cohesive mass of paving. Roadways prepared in this manner and containing large rocks are useful as warning or "rumble" strips for highways. In such cases, the mixtures of resin composition and aggregate may be used in thicknesses up to about three inches, and applied with conventional paving equipment. In such applications, the resilience, adhesion and durability of our mixed rigid and flexible polyester resins show up to considerable advantage over the compositions of the art.

To illustrate the manner in which the invention is carried out, the following examples are given. It is to be understood, however, that the examples are for the purpose of illustration only, and the invention is not to be regarded as limited to any of the specific compounds or conditions recited therein. Unless otherwise specified, parts disclosed in the examples are parts by weight.

EXAMPLE I

A rigid or unsaturated polyester was prepared in the following manner: Propylene glycol containing 0.004% by weight of hydroquinone inhibitor was heated with stirring to 50° C. under an inert gas blanket, and to it was added phthalic anhydride, in the proportion of 1.0 mole of anhydride per 2.2 moles of glycol. The resulting mixture was then heated to 150°C . and to it was added maleic anhydride in the proportion of 1.0 mole of anhydride per 2.2 moles of glycol. The temperature of this mixture was raised to 175° C. for over an hour and held there until the acid number of the mixture was less than about 50.

The polyester was then cooled to 150° C. and to it was added sufficient styrene inhibited with hydroquinone to make up a mixture containing 60% solids.

A flexible polyester containing saturated components was prepared in the following manner: Ethylene glycol and diethylene glycol, in equimolar proportions and containing 0.004% by weight of hydroquinone were heated together to 80° C. with stirring under an inert gas blanket. To the glycol mixture was added maleic anhydride, in a molar amount approximately 0.7 that of the total molar amount of glycols present, and adipic acid, in a molar amount approximately 0.3 that of the total glycols present. The temperature of the mixture was raised to 150° C. for over one hour, and then to 200° C. for over five hours, and held there until the acid number was less than about 60.

The resulting polyester was then cooled to 150° C. and inhibited styrene added to render the mixture 54% in solids.

From these resins the following composition was made up:

| | Parts by weight |
|---|---|
| Rigid polyester | 48.0 |
| Flexible polyester | 10.8 |
| Styrene | 41.2 |
| Cobalt naphthenate | 0.8 |
| Wax | 0.8 |
| Methyl ethyl ketone peroxide | 1.0 |
| Crushed quartz | 100.0 |

This composition was applied in a ¼ inch thick layer to a 10-square yard patch of highway on U.S. Route 22 in Union, New Jersey, after cleaning the concrete surface with 10% hydrochloric acid. The coating cured quickly to a hard adherent coating. After six months' exposure to heavy traffic, the patch showed no sign of failure.

A similar area coated with a corresponding composition but containing only rigid polyester failed in one week.

EXAMPLE II

Eight compositions were prepared from various amounts of unsaturated and flexible polyester resins, using various amounts of methyl ketone peroxide catalyst and cobalt naphthenate accelerator. Each of the eight formulations contained 0.5% wax by weight, based on the rigid resin. Each composition was applied in three different locations to 10-square-yard sections of a concrete highway, U.S. Route 22, near Union, New Jersey, and cured in place.

Data on the nature of these paving compositions appear in Table I, as well as on the method by which the highway surface was prepared prior to application of the composition, and how the paving composition was applied.

In patches 1-3, the coating was prepared by applying the clear resin liquid to the acid cleaned concrete surface and sprinkling sand on the resultant film. In patches 4-6 and 8, the paving composition was prepared by premixing crushed quartz with resin and squeegeeing the mixture over the surface. In patch 7, a coat of an epoxy resin was first applied to the clean highway surface.

The resins set very rapidly to a hard mass, requiring, however, several days to reach full toughness. This did not interfere with traffic, and they were all opened to traffic the day they were applied, even though full hardness was not obtained.

The performance of these patches over a period of time is summarized in Table II.

EXAMPLE III

The following polyester composition was prepared and spread in a density of three lbs./ft.² in several four-foot-square patches on the floor of a heavily used warehouse.

| | Parts by weight |
|---|---|
| Rigid polyester | 48 |
| Flexible polyester | 10.8 |
| Styrene | 41.2 |
| Methyl ethyl ketone peroxide | 1 |
| Cobalt naphthenate | 0.25 |
| Wax | 0.25 |

Sharp-edged particles of sand were spread over the patch in an amount approximately equal to that of the polyester resin, and the resin allowed to cure. Excess sand was then swept off.

At the end of twelve months, the patches were still in excellent condition and showed no loss of adhesion or apparent impairment of skid resistance.

*Table I*

| Patch No. | Preparation Method | Parts Polyester Resin, by Wt. | | Parts by weight | | | | Application | | Gel Time, Min. |
|---|---|---|---|---|---|---|---|---|---|---|
| | | Rigid | Flexible | Styrene | Quartz | Peroxide | Accelerator | Method | Density, lb./yd.² | |
| 1 | 10% HCl | 6 | 0 | 4 | 40 | 0.2 | 0.05 | Roller | 1 | 34 |
| 2 | 10% HCl | 4.8 | 1.1 | 4.1 | 40 | 0.1 | 0.04 | do | 1 | 20 |
| 3 | 10% HCl | 3 | 2.7 | 4.3 | 40 | 0.1 | 0.025 | do | 1 | 20 |
| 4 | 10% HCl | 27 | 0 | 18 | 180 | 0.45 | 0.225 | Squeegee | 4.5 | 17 |
| 5 | 10% HCl | 21.6 | 4.9 | 18.5 | 180 | 0.45 | 0.18 | do | 4.5 | 20 |
| 6 | 10% HCl | 13.2 | 11.9 | 18.9 | 176 | 0.45 | 0.11 | do | 4.5 | 13 |
| 7 | Epoxy resin base | 21.6 | 4.9 | 18.5 | 180 | 0.45 | 0.18 | do | 4.5 | |
| 8 | 10% HCl | 7.2 | 1.6 | 6.2 | 60 | 0.15 | 0.06 | Broom | 1.5 | 35 |

*Table II*

| Patch No. | Percent Area Intact after about Nine Months | Adhesive Strength, p.s.i. | |
|---|---|---|---|
| | | 1 Month | 3 Months |
| 1 | 53 | 212 | 217 |
| 2 | 63 | 118 | 268 |
| 3 | 55 | 55 | 160 |
| 4 | 84 | 114 | 176 |
| 5 | 100 | 90 | 128 |
| 6 | 100 | 83 | 74 |
| 7 | 40 | 131 | 122 |
| 8 | 85 | 217 | 100 |

We claim as our invention:

1. A process for paving previously used traffic-carrying surfaces having substantial extent in two dimensions with a protective, skid-resistant, long lasting pavement which comprises removing organic contaminants from the surface and spreading upon the cleaned surface a paving composition comprising a reactive monomeric solvent containing a mixture of polyester resins, of which from 70-90% is a rigid polyester resin prepared by the reaction of an acidic organic substance selected from the group consisting of polycarboxylic acids and anhydrides thereof, with an organic polyol, at least 90% of said components being selected from the group consisting of unsaturated and aromatic reactants; the remainder of the polyester resin being a flexible polyester resin prepared by the rection of an organic acidic substance selected from the group consisting of polycarboxylic acids and anhydrides thereof, at least 10% of which are saturated and linear, with an organic polyol; an organic peroxide; an air-impermeable organic substance; an accelerator; and at least 25% by weight of finely divided inert abrasive particles.

2. The process of claim 1, wherein the accelerator is the metal salt of an organic acid.

3. The process of claim 1, wherein the organic peroxide is a neutral organic peroxide.

4. The process of claim 1, wherein the air-impermeable organic substance is wax.

5. The process of claim 1, wherein the monomeric polymerizable compound is styrene.

6. The process of claim 1, wherein the flexible polyester resin includes the reaction product of adipic acid and an organic polyol.

7. A process for paving previously used traffic-carrying concrete surfaces having substantial extent in two dimensions with a protective, skid-resistant, long-lasting pavement which comprises removing organic contaminants from the surface by means including washing with dilute acid, and spreading upon the cleaned surface a paving composition comprising styrene containing a mixture of polyester resins, of which from 70–90% is a rigid polyester resin prepared by the reaction of an acidic organic substance selected from the group consisting of polycarboxylic acids and anhydrides thereof, with an organic polyol, at least 90% of said components being selected from the group consisting of unsaturated and aromatic reactants; the remainder of the polyester resin being a flexible polyester resin prepared by the reaction of an organic acidic substance selected from polycarboxylic acids and anhydrides thereof, at least 10% of which are saturated and linear, with an organic polyol; an organic neutral peroxide; a wax; an organic resin-soluble cobalt salt accelerator; and at least 25% by weight of finely divided inert abrasive particles.

8. A process for paving a previously used traffic-carrying surface having substantial extent in two dimensions with a protective, skid-resistant, long-lasting pavement which comprises removing organic contaminants from the surface; spreading upon the cleaned surface a paving composition comprising a reactive monomeric solvent containing a mixture of polyester resins, of which from 70–90% is a rigid polyester resin prepared by the reaction of an acidic organic substance selected from the group consisting of polycarboxylic acids and anhydrides thereof, with an organic polyol, at least 90% of said components being selected from the group consisting of unsaturated and aromatic reactants; the remainder of the polyester resin being a flexible polyester resin prepared by the reaction of an organic acidic substance selected from polycarboxylic acids and anhydrides thereof, at least 10% of which are saturated and linear, with an organic polyol; an organic peroxide; an air-impermeable organic substance; and an accelerator; spreading over the composition a layer of finely divided abrasive particles; allowing the composition to cure; and removing from the surface the excess inert particles.

9. A process for paving a traffic-carrying concrete surface having substantial extent in two dimensions with a protective, skid-resistant, long-lasting pavement which comprises spreading upon a clean concrete surface, free of organic contaminants, a paving composition comprising styrene containing a mixture of polyester resins, of which from 70 to 90% is a rigid polyester resin prepared by the reaction of an acidic organic substance selected from the group consisting of polycarboxylic acids and anhydrides thereof, with an organic polyol, at least 90% of said components being selected from the group consisting of unsaturated and aromatic reactants; the remainder of the polyester resin being a flexible polyester resin prepared by the reaction of an organic acidic substance selected from polycarboxylic acids and anhydrides thereof, at least 10% of which are saturated and linear, with an organic polyol; an organic neutral peroxide; a wax; and an organic resin-soluble cobalt salt accelerator; spreading over the composition a layer of finely divided abrasive particles; allowing the composition to cure; and removing from the surface the excess inert particles.

References Cited in the file of this patent

UNITED STATES PATENTS

| | | |
|---|---|---|
| 2,165,955 | Haarhoff | July 11, 1939 |
| 2,347,233 | Abernathy | Apr. 25, 1944 |
| 2,718,829 | Seymour | Sept. 27, 1955 |
| 2,751,775 | Sergovic | June 26, 1956 |
| 2,843,556 | Moorman | July 15, 1958 |
| 2,850,890 | Rubenstein | Sept. 9, 1958 |
| 2,856,378 | Lundberg | Oct. 14, 1958 |
| 2,895,389 | Nagin | July 21, 1959 |
| 2,897,733 | Shuger | Aug. 4, 1959 |
| 2,906,720 | Simpson | Sept. 29, 1959 |
| 2,925,831 | Welty | Feb. 23, 1960 |

FOREIGN PATENTS

| | | |
|---|---|---|
| 597,154 | Great Britain | 1948 |